Sept. 25, 1934.  E. A. HAGEL  1,974,776
COMBINED INSTRUMENT AND BLADE HOLDER
Filed Aug. 21, 1933
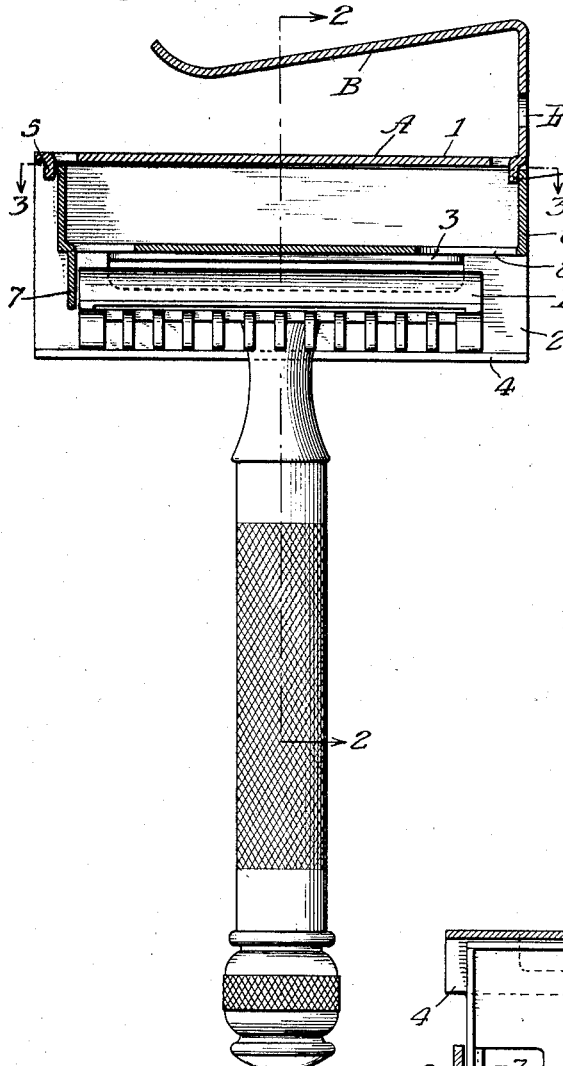
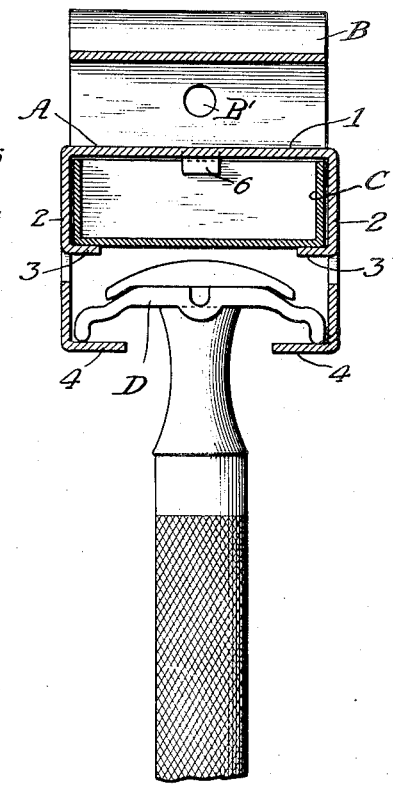
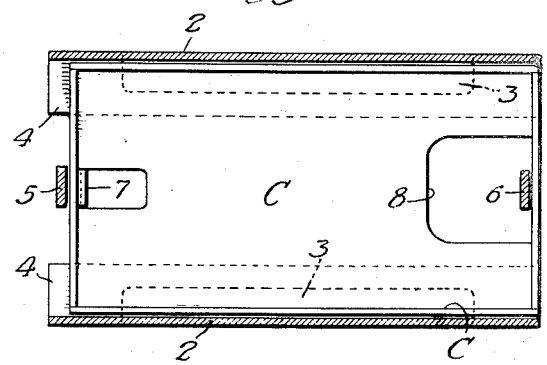
Inventor:
Eugene A. Hagel Patented Sept. 25, 1934

1,974,776

UNITED STATES PATENT OFFICE 1,974,776

COMBINED INSTRUMENT AND BLADE HOLDER

Eugene A. Hagel, Chicago, Ill.

Application August 21, 1933, Serial No. 686,018

5 Claims. (Cl. 206—16)

This invention relates to a holder adapted for convenient mounting and constructed to receive and house an instrument, for instance, a replaceable blade razor, as well as blades for use in connection therewith; and the invention has for its object to provide a very simple and cheap but efficient holder for this purpose.

The invention proceeds upon the principle of forming a housing of top and depending side walls, mounting a tray therein with opening and closing movements, and constructing its side walls with means for suspending beneath the tray the razor or other instrument that is to be held.

In the preferred embodiment, the suspending means for the housing comprises a resilient jaw spaced from the top wall of the housing and forming therewith a clip adapted to embrace the shelf or other available fixture, although this function may be supplied by forming an opening upon an extension of the housing appropriately for the reception of a screw or other projection carried by an available fixed structure; the depending side walls of the housing are formed with upper and lower pairs of slide tracks, one of which pairs supports the tray with opening and closing sliding movements while the lower pair of tracks offers suspending means for the instrument which may be slid into and out of sustained position thereon; the top wall is provided with a tray-arresting stop preferably in the form of a tongue of metal struck down from the top wall into the path of an end wall of the tray, said arresting stop being, if desired, duplicated at opposite ends of the tray slideway in order that the tray may be opened from either end of said slideway; and the tray is formed with a depending tongue that serves as a limiting stop for the instrument that is slid into position on the lower pair of tracks.

In the accompanying drawing—

Figure 1 is a vertical longitudinal section of the preferred embodiment of the device, with the instrument in position.

Figure 2 is a section on the line 2—2 of Figure 1; and

Figure 3 is a section on the line 3—3 of Figure 1.

A represents the housing, B the suspending clip, C the tray, and D the instrument. Housing A comprises a top wall 1 and depending side walls 2. Struck from the metal of the side walls 2 at an intermediate horizontal plane, are a pair of slide tracks 3 that receive the tray C, while beneath these tracks 3 are slide tracks 4, also made by deflecting portions of the side walls, for suspending the instrument when slid into position thereon. 5 and 6 represent two tray-arresting stops each in position to engage just inside of the outer end wall of the tray when the tray is introduced from the end at which the stop is located, thereby arresting the tray in the housing and within convenient reach for opening. 7 represents a limiting stop for the instrument D, provided by striking down a tongue of metal from the bottom of the tray C. Tray C has at the forward end of its bottom a finger-hole 8 for convenient engagement of the tray in opening it and simultaneously elevating the forward end of the blade or blade-pack within reach in withdrawing a blade for use.

Clip B serving as a resilient jaw and top wall A as a fixed jaw, adapts the holder to be slipped into suspended position upon a cabinet shelf or other available fixed structure; or, if it be desired to suspend the holder by means of a nail or screw, it may be hung on a support of this kind through the medium of the opening B′.

Tray C, when drawn to its forward limit, may readily be disengaged from its arresting stop 5 or 6 by vertical swinging movement or by merely dropping down the rear end of the tray, which may be permitted by proportioning the length of the slide tracks 3. Thus, the tray may be inserted from either end of the housing and, if reversed so that the end carrying the instrument stop 7 is the inserted end, the instrument may likewise be manipulated into and out of position from either end of the housing.

What is claimed is:

1. In combination, a housing having side walls constructed with upper and lower parallel pairs of slide tracks, a blade tray slidable upon the upper pair of tracks to open and closed position, a razor adapted to be slidably supported upon the lower tracks and movable thereon simultaneously with the movement of the tray upon its tracks, and means whereby the razor and the tray may impart sliding movement one to the other.

2. An instrument holder, comprising an open ended housing having side walls constructed with upper and lower parallel pairs of slide tracks, with a blade tray and an instrument simultaneously slidable upon the respective tracks, and in which the housing is provided with a limiting stop in the path of the sliding tray, and the tray is provided with a limiting stop in the path of the instrument when sliding upon the lower pair of tracks.

3. An instrument holder, comprising an open ended housing having side walls constructed with upper and lower parallel pairs of slide tracks, with a blade tray and an instrument simultaneously slidable upon the respective tracks, and in which the housing is provided with an arresting stop in position to engage the inner surface of the outer end wall of the tray when the latter is in closed position, and the tray has at its inner end an arresting stop in position to intercept an instrument sliding on the lower pair of tracks.

4. An instrument holder, comprising an open ended housing having side walls constructed with upper and lower parallel pairs of slide tracks, with a blade tray and an instrument simultaneously slidable upon the respective tracks, and in which the housing is open at both ends, is provided with a tray-arresting stop at each end, and the tray is insertable at each end of the housing.

5. An instrument holder, comprising an open ended housing having side walls constructed with upper and lower parallel pairs of slide tracks, with a blade tray and an instrument simultaneously slidable upon the respective tracks, and in which the housing is open at both ends, is provided with a tray-arresting stop at each end, and the tray is insertable at each end of the housing; each tray-arresting stop on the housing being in position to engage the inner surface of the outer end of the tray when the tray is introduced at the end at which the stop is located and in position to lie beyond the introduced end of the tray when the tray is entered at the end of the housing remote from the stop.

EUGENE A. HAGEL.